No. 728,032. PATENTED MAY 12, 1903.
F. McG. SMITH.
NUT LOCK.
APPLICATION FILED OCT. 29, 1902.

NO MODEL.

Witnesses
R. G. Bull
W. S. Duvall

Finley McG. Smith,
Inventor,
by John B. Thomas & Co.,
Attorneys.

No. 728,032. Patented May 12, 1903.

UNITED STATES PATENT OFFICE.

FINLEY McGREW SMITH, OF SALUBRIA, IDAHO.

NUT-LOCK.

SPECIFICATION forming part of Letters Patent No. 728,032, dated May 12, 1903.

Application filed October 29, 1902. Serial No. 129,294. (No model.)

*To all whom it may concern:*

Be it known that I, FINLEY MCGREW SMITH, a citizen of the United States, and a resident of Salubria, in the county of Washington and State of Idaho, have invented certain new and useful Improvements in Nut-Locks, of which the following is a specification.

The object of this invention is to provide a locking device for firmly and securely connecting a nut to its bolt, whereby the said nut when screwed home will be held in intimate connection with the bolt and prevented from working loose thereon.

Though the invention has a wide field of application, it is especially adapted for locking the nuts of the connecting-bolts of railroad-rails to prevent such nuts from working loose, for inasmuch as there is a constant jar or vibration to the rails during the passing of a train of cars it is absolutely necessary to provide some means for keeping the nuts tightened.

The invention contemplates the provision of means whereby the nut may be tightened to any desired extent and the locking device carried thereby automatically engage the bolt to intimately connect them together, also to provide means by which the said locking means may be thrown and held out of operative position to permit the nut to be readily and conveniently unscrewed at any time.

With the above objects in view the invention consists in the combination, with the bolt having a series of longitudinal grooves therein, of a nut having a cavity in its outer face and surrounding the bolt-opening, a spring-pawl attached to the nut and having a free end adapted to engage the grooves in the bolt, and a stud or pin adapted to hold the spring either in or out of engagement with the bolt.

The invention further consists in the particular construction and combination of parts, all as hereinafter fully described, and more specifically set forth in the appended claims.

Figure 1:
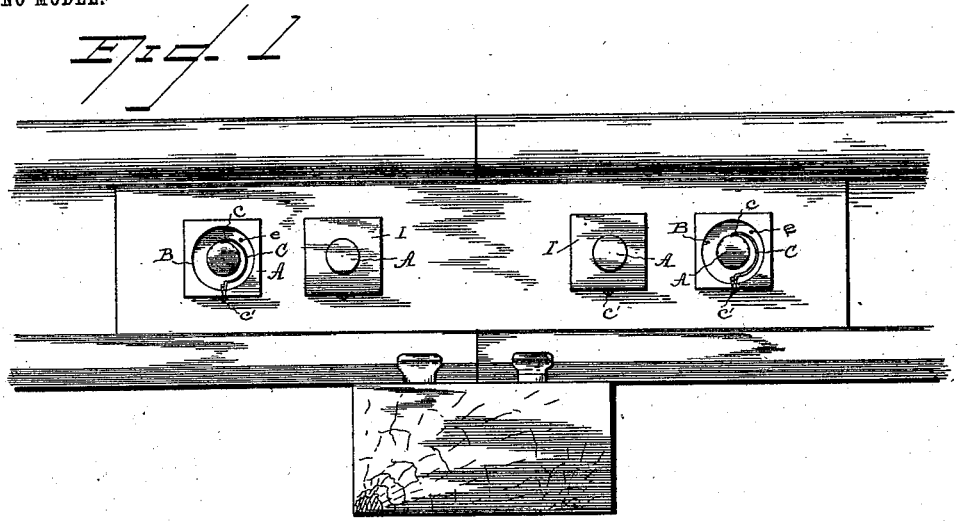
Figures 2, 3:
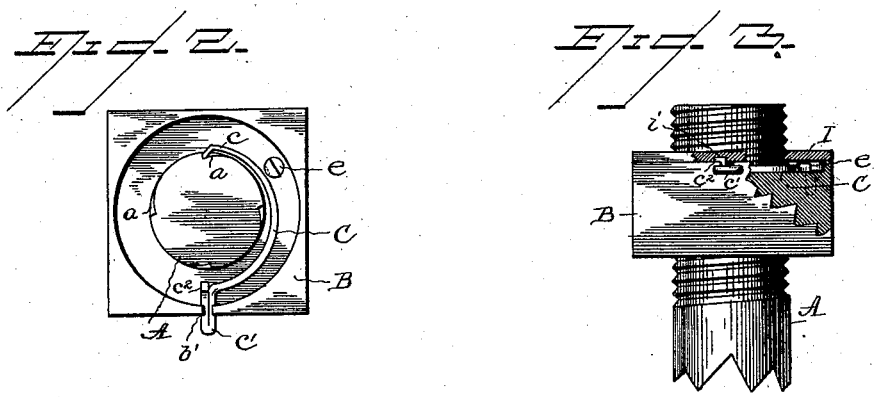

In the accompanying drawings, which form a part of this specification, Figure 1 is a front elevation showing the application of my invention to the connecting-bolts of railroad-rails. Fig. 2 is a plan view, the covering-plate being removed. Fig. 3 is a detail side elevation, parts being broken away to better show the features of construction.

Like letters of reference indicate like parts in the several views of the drawings.

The letter A designates the bolt, and B the nut, and in carrying out my invention the bolt is provided with a series of longitudinal grooves $a$, the said series extending entirely around the bolt and the grooves being in the form of ratchet-teeth—that is, with radial and tangential faces. The nut is provided in its front face with a cavity extending around the bolt-opening, in which cavity the locking device is located.

C designates a spring-pawl which is attached to the nut at one side of the cavity and is curved, as shown, and the free end $c$ thereof flattened and hook-shaped to engage the grooves $a$ in the bolt, extending around to near the opposite side of the bolt. In attaching this spring-pawl, which is preferably made of wire, one end thereof is bent upon itself, as indicated at $c'$, and inserted in a recess $b'$ in the nut, after which the side walls of the recess are upset on said bent end of the pawl.

Within the cavity and adjoining the spring-pawl is located a lug or stud $e$, one side of which is slightly grooved and the other side cut away to form a shoulder, and this stud or pin is designed to hold the pawl either in or out of engagement with the bolt.

In the operation of the device the nut is screwed upon the bolt in the usual manner, and when the end of the bolt projects beyond the base of the cavity in the nut the pawl is placed in engagement with said bolt. The nut being tightened upon the bolt, the spring-pawl automatically engages the grooves in the bolt and holds said nut from turning backward or unscrewing. When in engagement with the bolt, the pawl will be held positively and firmly by means of the stud or pin, and when it is desired to unscrew the nut the spring-pawl may be held back out of operation by engagement with the other side of the pin or stud.

I purpose to cover the cavity in the nut by a thin metal plate I, having a recess $i$ in its under side engaged by the upwardly-bent terminal $c^2$ of the spring-pawl, said plate being threaded on the bolt. The plate will be securely held in place by the terminal $c^2$ engaging the recess therein.

Having thus described my invention, I claim—

1. In a nut-lock, the combination with the bolt having longitudinal grooves therein, of a nut provided with a cavity surrounding the bolt-hole, a spring wire pawl having one end bent upon itself and attached at one side of the nut, the terminal portion of said bent end being turned upward in the cavity to provide an engaging member, and a covering-plate adapted to be screwed upon the bolt and provided with a recess with which the aforesaid terminal member of the pawl engages, substantially as shown and described.

2. In a nut-lock, the combination with the bolt having grooves therein, of a nut provided with a cavity surrounding the bolt-hole therein, a spring-pawl located in the cavity of the nut and attached to the nut at one side of said cavity, said spring-pawl having an upwardly-bent terminal, and a covering-plate threaded on the bolt and having a recess with which the aforesaid terminal of the spring-pawl engages; together with a stud or pin adapted to engage the spring-pawl, substantially as described.

In testimony whereof I affix my signature in the presence of two witnesses.

FINLEY McGREW SMITH.

Witnesses:
L. W. SMITH,
R. H. MARTIN.